(12) United States Patent
Geelhoed (10) Patent No.: US 11,465,920 B2
(45) Date of Patent: Oct. 11, 2022

(54) WATER PURIFICATION SYSTEM

(71) Applicant: Fermi Research Alliance, LLC, Batavia, IL (US)

(72) Inventor: Michael Geelhoed, North Aurora, IL (US)

(73) Assignee: Fermi Research Alliance, LLC, Batavia, IL (US)

( * ) Notice: Subject to any disclaimer, the term of this patent is extended or adjusted under 35 U.S.C. 154(b) by 157 days.

(21) Appl. No.: 16/505,838

(22) Filed: Jul. 9, 2019

(65) Prior Publication Data
US 2021/0009443 A1   Jan. 14, 2021

(51) Int. Cl.
| | | |
|---|---|---|
| C02F 1/30 | (2006.01) | |
| H05H 7/20 | (2006.01) | |
| C02F 1/00 | (2006.01) | |
| C02F 1/44 | (2006.01) | |
| C02F 1/28 | (2006.01) | |

(52) U.S. Cl.
CPC ............ *C02F 1/305* (2013.01); *C02F 1/001* (2013.01); *C02F 1/283* (2013.01); *C02F 1/441* (2013.01); *H05H 7/20* (2013.01); *C02F 2209/40* (2013.01); *C02F 2303/04* (2013.01)

(58) Field of Classification Search
None
See application file for complete search history.

(56) References Cited

U.S. PATENT DOCUMENTS

| | | | |
|---|---|---|---|
| 3,901,807 A * | 8/1975 | Trump | H01J 33/00 422/187 |
| 6,101,835 A | 8/2000 | Butsch et al. | |
| 6,172,463 B1 | 1/2001 | Cutler et al. | |
| 6,524,447 B1 | 2/2003 | Carmignani et al. | |
| 6,713,540 B2 | 3/2004 | Rached et al. | |
| 7,140,771 B2 | 11/2006 | Leek | |
| 8,159,158 B2 | 4/2012 | Popovic | |
| 8,198,350 B2 | 6/2012 | Fee et al. | |
| 8,277,738 B2 | 10/2012 | Kim et al. | |
| 8,389,642 B2 | 3/2013 | Goto et al. | |
| 8,674,630 B1 | 3/2014 | Cornelius | |
| 8,779,697 B2 * | 7/2014 | Baurichter | H05H 7/18 315/505 |
| 9,186,645 B2 | 11/2015 | Kephart | |
| 9,340,931 B2 | 5/2016 | Kephart | |
| 9,398,681 B2 | 7/2016 | Tantawi et al. | |

(Continued)

FOREIGN PATENT DOCUMENTS

| | | |
|---|---|---|
| WO | 2013090342 A1 | 6/2013 |
| WO | 2016043783 A1 | 3/2016 |

*Primary Examiner* — Magali P Slawski
*Assistant Examiner* — Brad Gordon
(74) *Attorney, Agent, or Firm* — Loza & Loza LLP; Kevin L. Soules (57) ABSTRACT

A method and system for water purification includes a particle accelerator configured to generate a particle beam and a conduit configured to be substantially in line with the particle beam wherein said electron beam is incident on a fluid flowing through the conduit. The electron beam can be oriented to be substantially head on to the direction of flow of the fluid in the conduit. A shielding assembly can be configured around the conduit. A cartridge filtering system and contaminant filtering system can be provided to remove additional contaminants.

16 Claims, 8 Drawing Sheets

(56) References Cited

U.S. PATENT DOCUMENTS

| | | |
|---|---|---|
| 9,642,239 B2 | 5/2017 | Kephart |
| 10,070,509 B2 | 11/2018 | Kephart |
| 2004/0085096 A1 | 5/2004 | Ward et al. |
| 2005/0269254 A1 | 12/2005 | Roitman |
| 2006/0186026 A1* | 8/2006 | Saleh ............... C02F 9/005 210/134 |
| 2008/0068112 A1 | 3/2008 | Yu et al. |
| 2011/0052455 A1* | 3/2011 | Kim ............... H01J 37/06 422/186 |
| 2011/0081553 A1 | 4/2011 | Mehlmann et al. |
| 2012/0295048 A1 | 11/2012 | Al-Malaika et al. |
| 2012/0326636 A1 | 12/2012 | Eaton et al. |
| 2013/0316087 A1 | 11/2013 | Ahn et al. |
| 2014/0270955 A1 | 9/2014 | Coe |
| 2016/0035531 A1 | 2/2016 | Lunin et al. |
| 2017/0094770 A1* | 3/2017 | Kephart ............... H05H 7/22 |

* cited by examiner

WATER PURIFICATION SYSTEM

STATEMENT OF GOVERNMENT RIGHTS

The invention described in this patent application was made with Government support under the Fermi Research Alliance, LLC, Contract Number DE-AC02-07CH11359 awarded by the U.S. Department of Energy. The Government has certain rights in the invention.

TECHNICAL FIELD

Embodiments are generally related to the field of fluid purification devices. Embodiments are also related to the field of water purification devices. Embodiments are further related to the field of mobile water purification devices. Embodiments are further related to the field of electron beam devices. Embodiments are also related to particle accelerators. Embodiments are also related to the field of mobile accelerators. Embodiments are also related to purifying water with an electron beam device. Embodiments are further related to methods, systems, and apparatuses for treating water using a mobile electron beam from a mobile accelerator.

BACKGROUND

One of the primary challenges in any natural disaster situation is to provide potable water to those affected. In the case of flooding, the municipal drinking water source is often contaminated by floodwater. Disaster victims may be left without access to potable water for days or even weeks. It is exceedingly difficult to distribute drinking water to those stranded by floodwater. Thus, providing access to potable water is a prime directive in any disaster relief effort.

Conventional methods for water delivery during or after a natural disaster include delivery of bottled water to those in need, often with land, water, or air based vehicles. Such methods are costly and time consuming. Often, delivery routes are limited and/or the cost of delivery is prohibitive. In some cases, flooding may render conventional delivery methods impossible. Beyond these downsides, there is a measurable environmental impact associated with the delivery of bottled water to disaster relief zones. It would therefore be beneficial to decontaminant water on-site.

An electron accelerator refers generally to a type of apparatus capable of accelerating electrons generated from an electron gun in a vacuum condition through a high voltage generator or RF structure to impart increased energy to the electron, and diffusing the electrons so as to emit electron beams having high energy close to the speed of light through a beam extraction device so that the electrons are extracted from the vacuum condition and can impinge on a target object. An electron accelerator accelerates the electrons generated from the electron gun and emits an electron beam having a regular width while scanning in a scan coil in the beam extraction device so as to cause the electron beam to irradiate a target object in a controlled fashion. Electrons emitted from such devices, may be effective in treating water to make it safe for human consumption.

It would be advantageous to find a way to deliver potable water to disaster victims that does not require widespread and/or long range distribution. As such, there is a need to address problems associated with delivering potable water to places affected by natural disasters according to the methods and systems disclosed herein.

SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide a method, system, and apparatus for treating water.

It is an aspect of the disclosed embodiments to provide methods and systems for water production.

It is an aspect of the disclosed embodiments to provide methods and systems for electron beam systems coupled to fluid delivery systems.

It is an aspect of the disclosed embodiments to provide methods and systems for location-based mobile water treatment.

It is an aspect of the disclosed embodiments to provide methods and systems for rapid water treatment in locations affected by natural disasters via mobile water treatment devices.

In an exemplary embodiment, a system for water treatment includes a particle accelerator configured to generate a particle beam and a conduit configured to be substantially in line with the particle beam wherein the electron beam is incident on a fluid flowing through the conduit. The electron beam can be oriented to be substantially head on to the direction of fluid flow in the conduit. A shielding assembly can be configured around the conduit. A cartridge filtering system and contaminant filtering system can be provided to remove additional contaminants.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in the following non-limiting examples can be varied, and are cited merely to illustrate one or more embodiments and are not intended to limit the scope thereof.

Example embodiments will now be described more fully hereinafter with reference to the accompanying drawings, in which illustrative embodiments are shown. The embodiments disclosed herein can be embodied in many different forms and should not be construed as limited to the embodiments set forth herein; rather, these embodiments are provided so that this disclosure will be thorough and complete, and will fully convey the scope of the embodiments to those skilled in the art. Like numbers refer to like elements throughout.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. In addition, the term "based on" may be understood as not necessarily intended to convey an exclusive set of factors and may, instead, allow for existence of additional factors not necessarily expressly described, again, depending at least in part on context.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
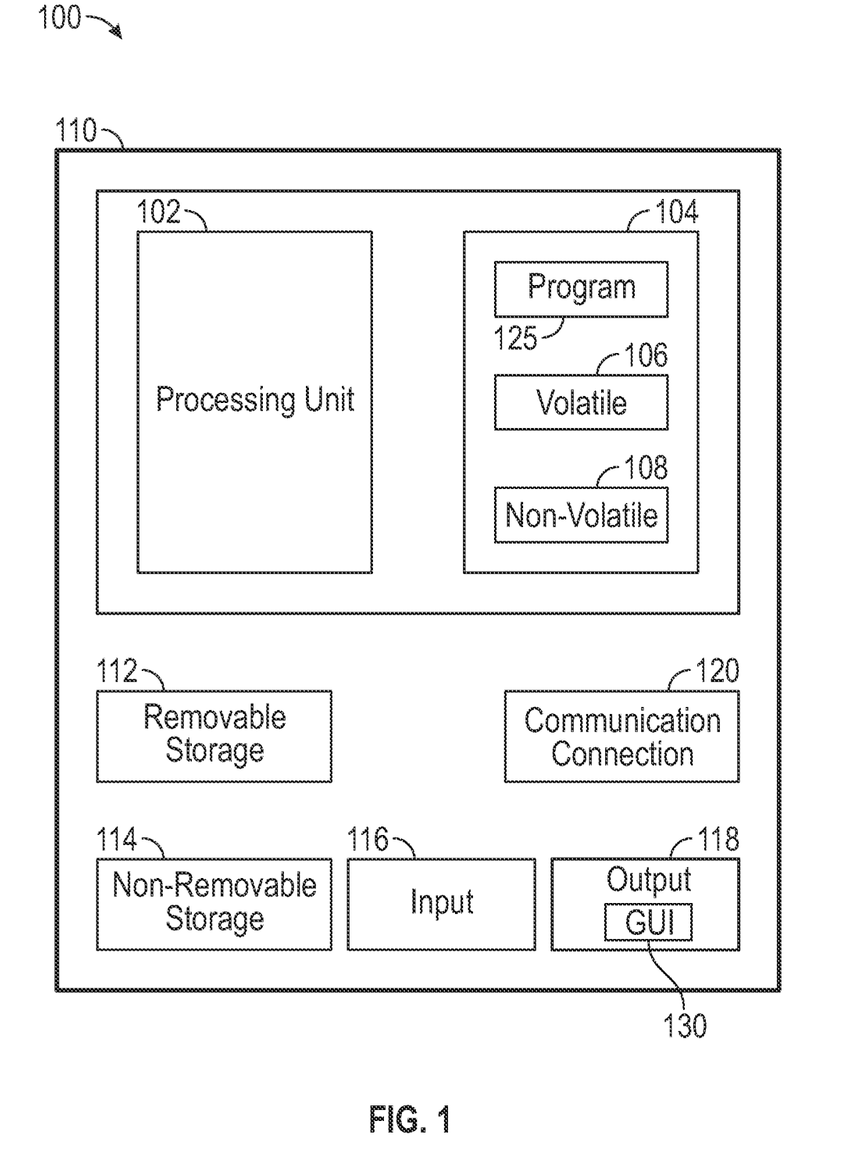
FIG. 1 depicts a block diagram of a computer system which is implemented in accordance with the disclosed embodiments.
Figure 2:
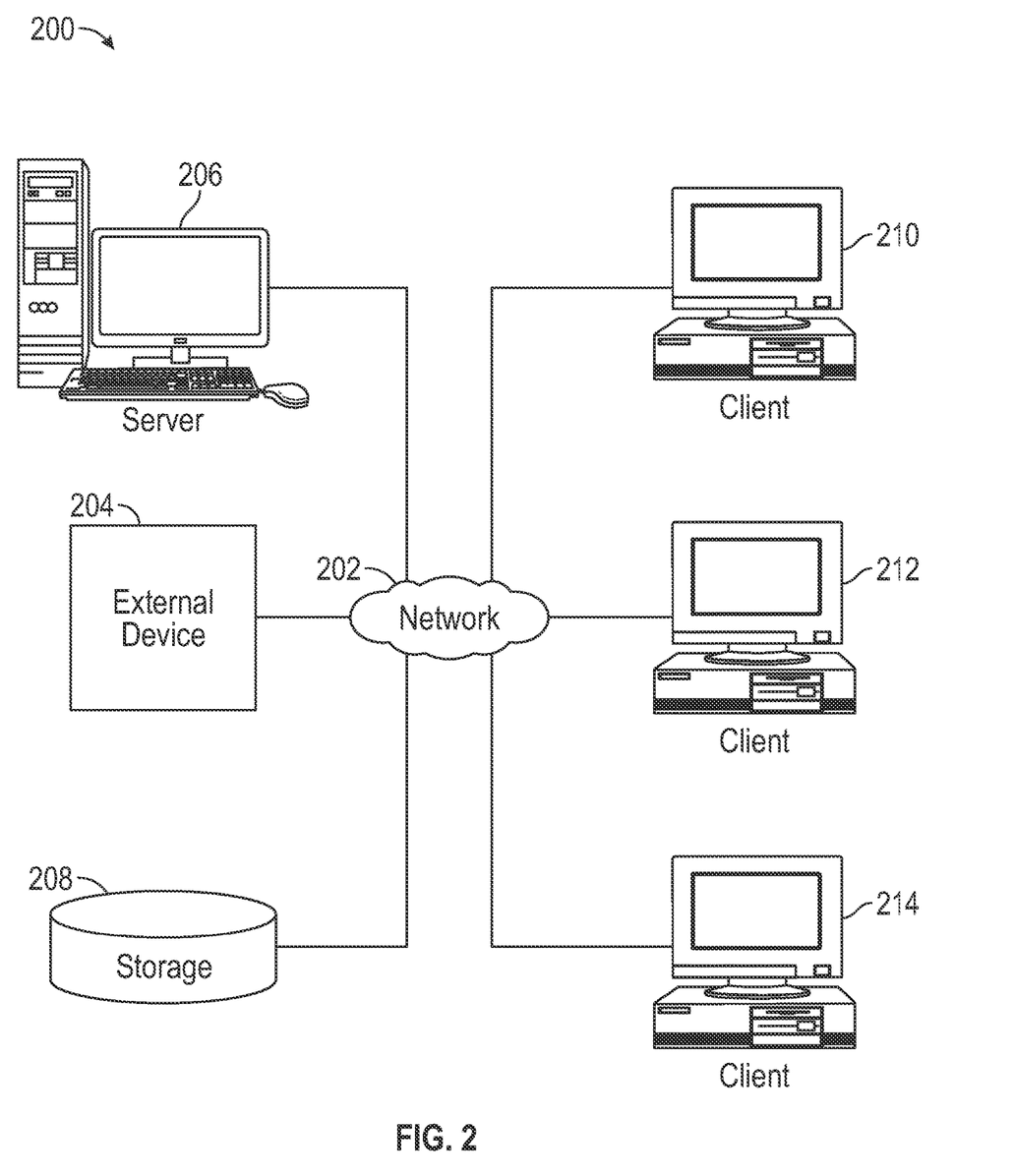
FIG. 2 depicts a graphical representation of a network of data-processing devices in which aspects of the present embodiments may be implemented.
Figure 3:
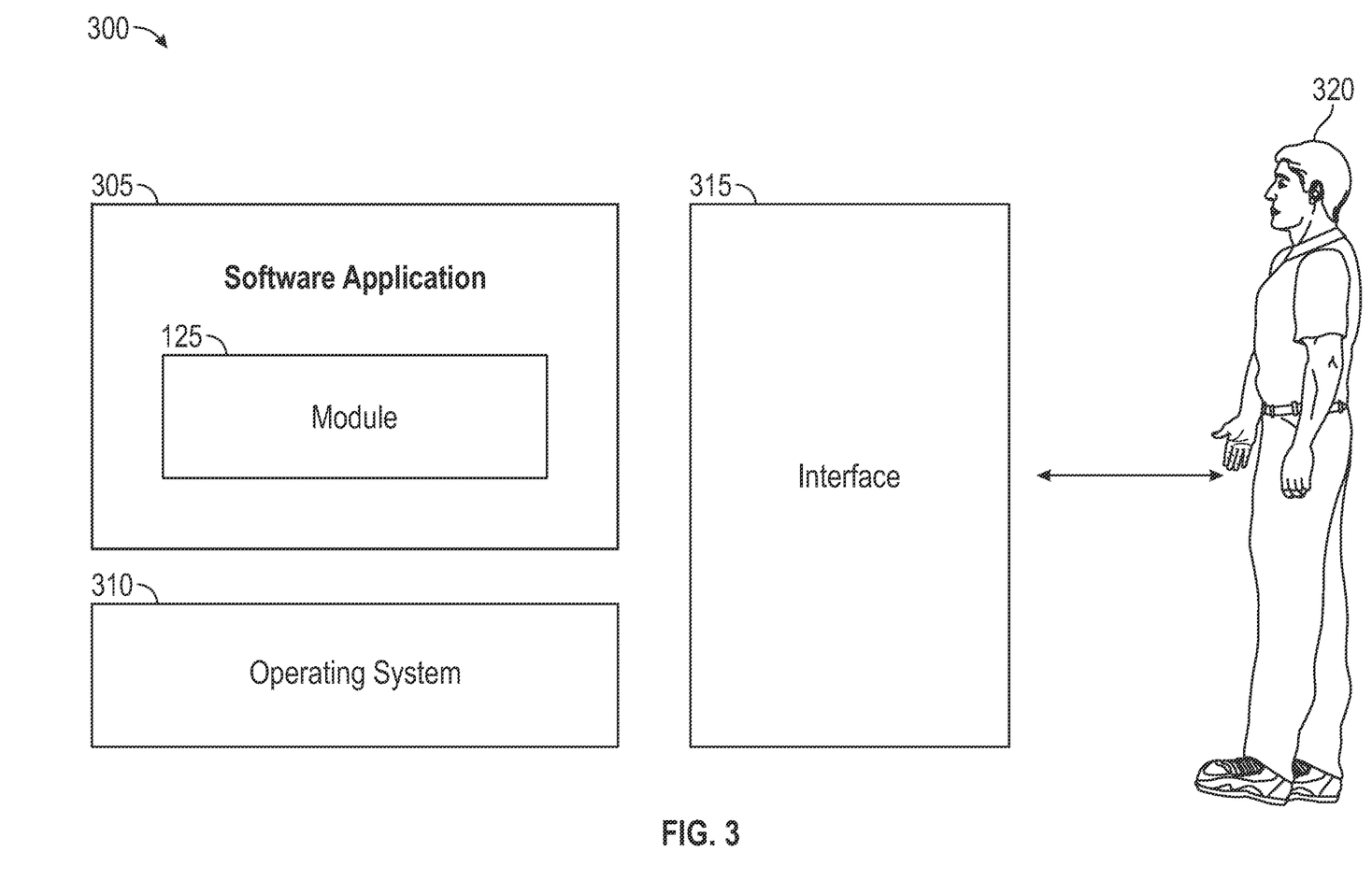
FIG. 3 depicts a computer software system for directing the operation of the data-processing system depicted in FIG. 1, in accordance with an embodiment.

FIGS. 1-3 are provided as exemplary diagrams of data-processing environments in which embodiments of the present invention may be implemented. It should be appreciated that FIGS. 1-3 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

A block diagram of a computer system 100 that executes programming for implementing parts of the methods and systems disclosed herein is shown in FIG. 1. A computing device in the form of a computer 110 configured to interface with sensors, peripheral devices, and other elements disclosed herein may include one or more processing units 102, memory 104, removable storage 112, and non-removable storage 114. Memory 104 may include volatile memory 106 and non-volatile memory 108. Computer 110 may include or have access to a computing environment that includes a variety of transitory and non-transitory computer-readable media such as volatile memory 106 and non-volatile memory 108, removable storage 112 and non-removable storage 114. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions as well as data including image data.

Computer 110 may include or have access to a computing environment that includes input 116, output 118, and a communication connection 120. The computer may operate in a networked environment using a communication connection 120 to connect to one or more remote computers, remote sensors, detection devices, hand-held devices, multi-function devices (MFDs), mobile devices, tablet devices, mobile phones, Smartphones, or other such devices. The remote computer may also include a personal computer (PC), server, router, network PC, RFID enabled device, a peer device or other common network node, or the like. The communication connection may include a Local Area Network (LAN), a Wide Area Network (WAN), Bluetooth connection, or other networks. This functionality is described more fully in the description associated with FIG. 2 below.

Output 118 is most commonly provided as a computer monitor, but may include any output device. Output 118 and/or input 116 may include a data collection apparatus associated with computer system 100. In addition, input 116, which commonly includes a computer keyboard and/or pointing device such as a computer mouse, computer track pad, or the like, allows a user to select and instruct computer system 100. A user interface can be provided using output 118 and input 116. Output 118 may function as a display for displaying data and information for a user, and for interactively displaying a graphical user interface (GUI) 130.

Note that the term "GUI" generally refers to a type of environment that represents programs, files, options, and so forth by means of graphically displayed icons, menus, and dialog boxes on a computer monitor screen. A user can interact with the GUI to select and activate such options by directly touching the screen and/or pointing and clicking with a user input device 116 such as, for example, a pointing device such as a mouse and/or with a keyboard. A particular item can function in the same manner to the user in all applications because the GUI provides standard software routines (e.g., module 125) to handle these elements and report the user's actions. The GUI can further be used to display the electronic service image frames as discussed below.

Computer-readable instructions, for example, program module or node 125, which can be representative of other modules or nodes described herein, are stored on a computer-readable medium and are executable by the processing unit 102 of computer 110. Program module or node 125 may include a computer application. A hard drive, CD-ROM, RAM, Flash Memory, and a USB drive are just some examples of articles including a computer-readable medium.

FIG. 2 depicts a graphical representation of a network of data-processing systems 200 in which aspects of the present invention may be implemented. Network data-processing system 200 is a network of computers or other such devices such as mobile phones, smartphones, sensors, detection devices, controllers and the like in which embodiments of the present invention may be implemented. Note that the system 200 can be implemented in the context of a software module such as program module 125. The system 200 includes a network 202 in communication with one or more clients 210, 212, and 214. Network 202 may also be in communication with one or more devices 204, servers 206, and storage 208. Network 202 is a medium that can be used to provide communications links between various devices and computers connected together within a networked data processing system such as computer system 100. Network 202 may include connections such as wired communication links, wireless communication links of various types, fiber optic cables, quantum, or quantum encryption, or quantum teleportation networks, etc. Network 202 can communicate with one or more servers 206, one or more external devices such as a controller, actuator, particle accelerator, associated electron beam accelerator, or other such device 204, and a memory storage unit such as, for example, memory or database 208. It should be understood that device 204 may be embodied as a detector device, microcontroller, controller, receiver, transceiver, or other such device.

In the depicted example, device 204, server 206, and clients 210, 212, and 214 connect to network 202 along with storage unit 208. Clients 210, 212, and 214 may be, for example, personal computers or network computers, handheld devices, mobile devices, tablet devices, smartphones, personal digital assistants, microcontrollers, recording devices, MFDs, etc. Computer system 100 depicted in FIG. 1 can be, for example, a client such as client 210 and/or 212.

Computer system 100 can also be implemented as a server such as server 206, depending upon design considerations. In the depicted example, server 206 provides data such as boot files, operating system images, applications, and application updates to clients 210, 212, and/or 214. Clients 210, 212, and 214 and external device 204 are clients to server 206 in this example. Network data-processing system 200 may include additional servers, clients, and other devices not shown. Specifically, clients may connect to any member of a network of servers, which provide equivalent content.

In the depicted example, network data-processing system 200 is the Internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages. Of course, network data-processing system 200 may also be implemented as a number of different types of networks such as, for example, an intranet, a local area network (LAN), or a wide area network (WAN). FIGS. 1 and 2 are intended as examples and not as architectural limitations for different embodiments of the present invention.

FIG. 3 illustrates a software system 300, which may be employed for directing the operation of the data-processing systems such as computer system 100 depicted in FIG. 1. Software application 305, may be stored in memory 104, on removable storage 112, or on non-removable storage 114 shown in FIG. 1, and generally includes and/or is associated with a kernel or operating system 310 and a shell or interface 315. One or more application programs, such as module(s) or node(s) 125, may be "loaded" (i.e., transferred from removable storage 114 into the memory 104) for execution by the data-processing system 100. The data-processing system 100 can receive user commands and data through user interface 315, which can include input 116 and output 118, accessible by a user 320. These inputs may then be acted upon by the computer system 100 in accordance with instructions from operating system 310 and/or software application 305 and any software module(s) 125 thereof.

Generally, program modules (e.g., module 125) can include, but are not limited to, routines, subroutines, software applications, programs, objects, components, data structures, etc., that perform particular tasks or implement particular abstract data types and instructions. Moreover, those skilled in the art will appreciate that elements of the disclosed methods and systems may be practiced with other computer system configurations such as, for example, handheld devices, mobile phones, smart phones, tablet devices, multi-processor systems, printers, copiers, fax machines, multi-function devices, data networks, microprocessor-based or programmable consumer electronics, networked personal computers, minicomputers, mainframe computers, servers, medical equipment, medical devices, and the like.

Note that the term module or node as utilized herein may refer to a collection of routines and data structures that perform a particular task or implements a particular abstract data type. Modules may be composed of two parts: an interface, which lists the constants, data types, variables, and routines that can be accessed by other modules or routines; and an implementation, which is typically private (accessible only to that module) and which includes source code that actually implements the routines in the module. The term module may also simply refer to an application such as a computer program designed to assist in the performance of a specific task such as word processing, accounting, inventory management, etc., or a hardware component designed to equivalently assist in the performance of a task.

The interface 315 (e.g., a graphical user interface 130) can serve to display results, whereupon a user 320 may supply additional inputs or terminate a particular session. In some embodiments, operating system 310 and GUI 130 can be implemented in the context of a "windows" system. It can be appreciated, of course, that other types of systems are possible. For example, rather than a traditional "windows" system, other operation systems such as, for example, a real time operating system (RTOS) more commonly employed in wireless systems may also be employed with respect to operating system 310 and interface 315. The software application 305 can include, for example, module(s) 125, which can include instructions for carrying out steps or logical operations such as those shown and described herein.

The following description is presented with respect to embodiments of the present invention, which can be embodied in the context of, or require the use of a data-processing system such as computer system 100, in conjunction with program module 125, and data-processing system 200 and network 202 depicted in FIGS. 1-3. The present invention, however, is not limited to any particular application or any particular environment. Instead, those skilled in the art will find that the systems and methods of the present invention may be advantageously applied to a variety of system and application software including database management systems, word processors, and the like. Moreover, the present invention may be embodied on a variety of different platforms including Windows, Macintosh, UNIX, LINUX, Android, Arduino and the like. Therefore, the descriptions of the exemplary embodiments, which follow, are for purposes of illustration and not considered a limitation. In other embodiments, manual control of various aspects may be achievable while closely monitoring read backs.

The embodiments disclosed herein relate to fluid (e.g. water, industrial runoff, medical waste, or other fluid) treatment systems. In certain embodiments, mobile water treatment systems involve the treatment of water with an electron beam. One important aspect of the water treatment systems disclosed herein, is the orientation of the electron beam with respect to the orientation of the fluid flow. Specifically, in certain aspects of the embodiments, the orientation of the beam is selected to have an angle of incidence of approximately 0 degrees (e.g. in line with), or approximately 180 degrees (e.g. head on to), the direction of flow. In certain aspects, the flow can be laminar or substantially laminar. In certain embodiments, the conduit can be arranged to be substantially vertical, with water being pumped vertically to provide a laminar flow. However, in other embodiments, other conduit orientations are possible, provided the flow remains substantially laminar.

This configuration allows the penetration depth of the electrons (associated with the power of the electron beam) to be very precisely adjusted according to the flow rate of the water so that the correct dosage can be applied to ensure the water is safe for human consumption.

The two dimensional cross-section of the electron beam can also be very precisely selected to match or substantially match the inner diameter of the conduit through which the water is flowing to maximize the interactive cross section. As such, the system is certain to fully treat all the water flowing through the conduit and essentially all of the electrons are put to use treating the water. In certain embodiments, a wire profile monitor can be used to collect beam profile measurements. The profile measurements can be used to ensure the beam profiles are standard and that all of the electrons are being used for fluid purification. The disclosed embodiments are highly efficient, both in terms of purification percentage, and in terms of energy use.

Figure 4:
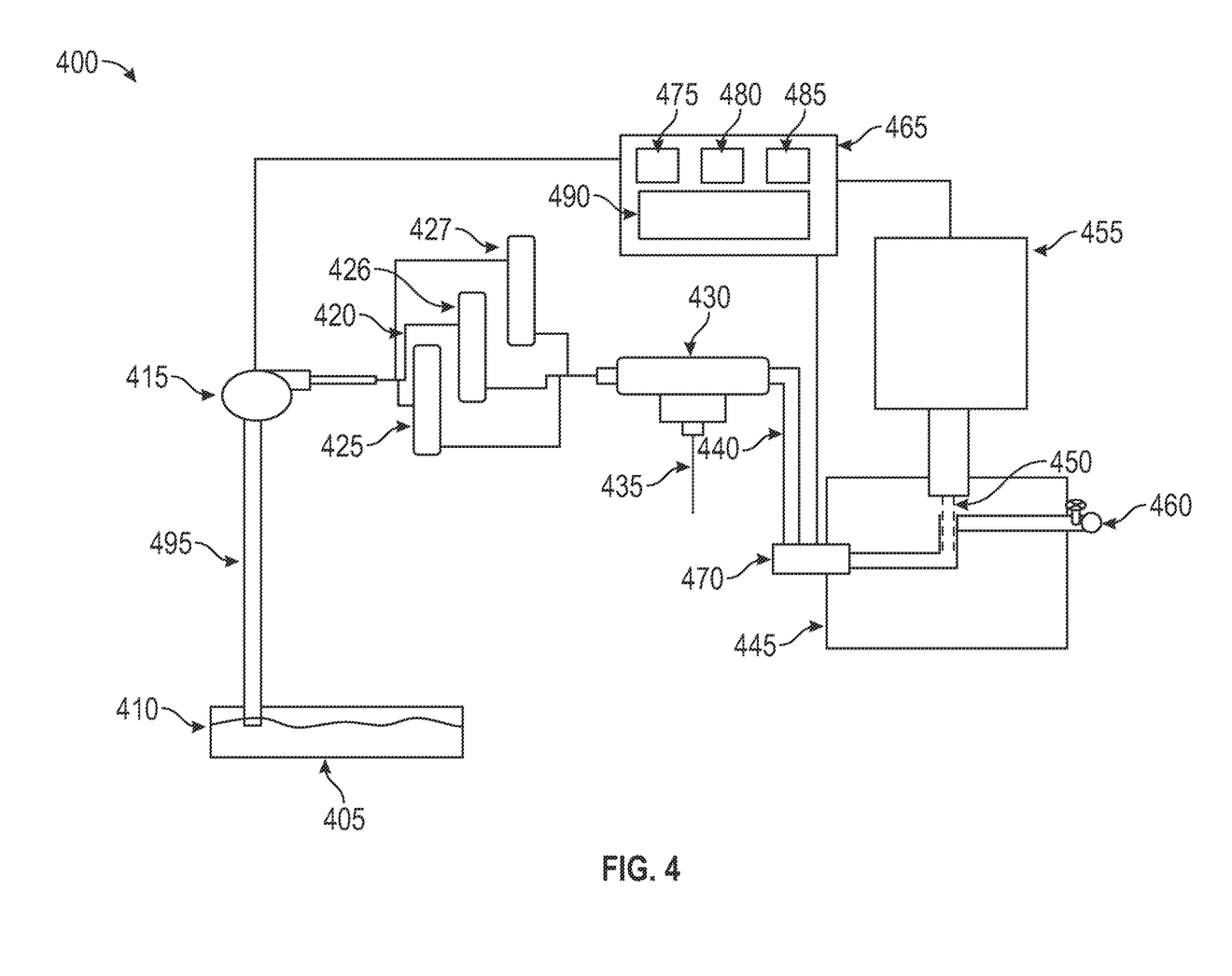
FIG. 4 depicts a water treatment system, in accordance with the disclosed embodiments.

FIG. 4 illustrates a water treatment system 400 in accordance with the disclosed embodiments. The water treatment system 400 includes a water source 405. It should be appreciated that the water source 405 can comprise a municipal water source, city water system, well, tank, lake, aquifer, or other such water sources. The water source 405 need not be potable.

The water 410 from the water source 405 can be pumped from the water source 405 with a pump 415. The pump 415 can comprise a submersible pump, in which case it will be disposed in the water source 405. In other embodiments, the pump can comprise any fluid pumping mechanism capable of moving the water 410 through the water treatment system 400. Additional pumps can be disposed along the fluid path of the system, as necessary to provide the requisite and/or desired flow rate.

The water 410 is pumped from the water source 405 to a cartridge filtering system 420 with an arrangement of pipes or conduits 495. The cartridge filtering system 420 can be optional, as downstream components will make the water safe to drink. However, the cartridge filter system is useful to remove particulate matter that will make the water potentially unpleasant to consume. In certain embodiments, the cartridge filtering system can comprise one or more, 5 micron or larger cartridge filters.

The cartridge filtering system 420 can comprises a series of one or more cartridge filters configured to remove particulate matter from the water 410. FIG. 4 illustrates a cartridge filtering system 420 with three filters, filter 425, filter 426, and filter 427. It should be appreciated that the cartridge filtering system can comprise more, or fewer filters in other embodiments.

Once the particulate matter is removed from the water 410, the water 410 can then be pumped through a second contaminant filter 430. The order of filters 420 and 430 can be reversed in certain embodiments. As with the cartridge filtering system 420, the contaminant filter 430 can be optional, as downstream components will ensure the water is potable. However, the contaminant filter 430 is desirable to remove unpleasant minerals that may make the water unpleasant to drink.

The contaminant filter 430 can comprise one or more of a reverse osmosis filter, a granular activated carbon filter, a deionized filtering system, or other such filter, to remove impurities, minerals, and other such substances from the water. The contaminant filter 430 can output a concentrate stream 435 of waste, and a permeate stream 440 of filtered water. It should be noted that the permeate stream 440 will be free of many contaminants and particulate matter. However, micro-organisms, *E. coli*, viral contaminants, and other biohazards that may be harmful to humans if consumed, may still be present in the permeate stream 440.

Figure 7:
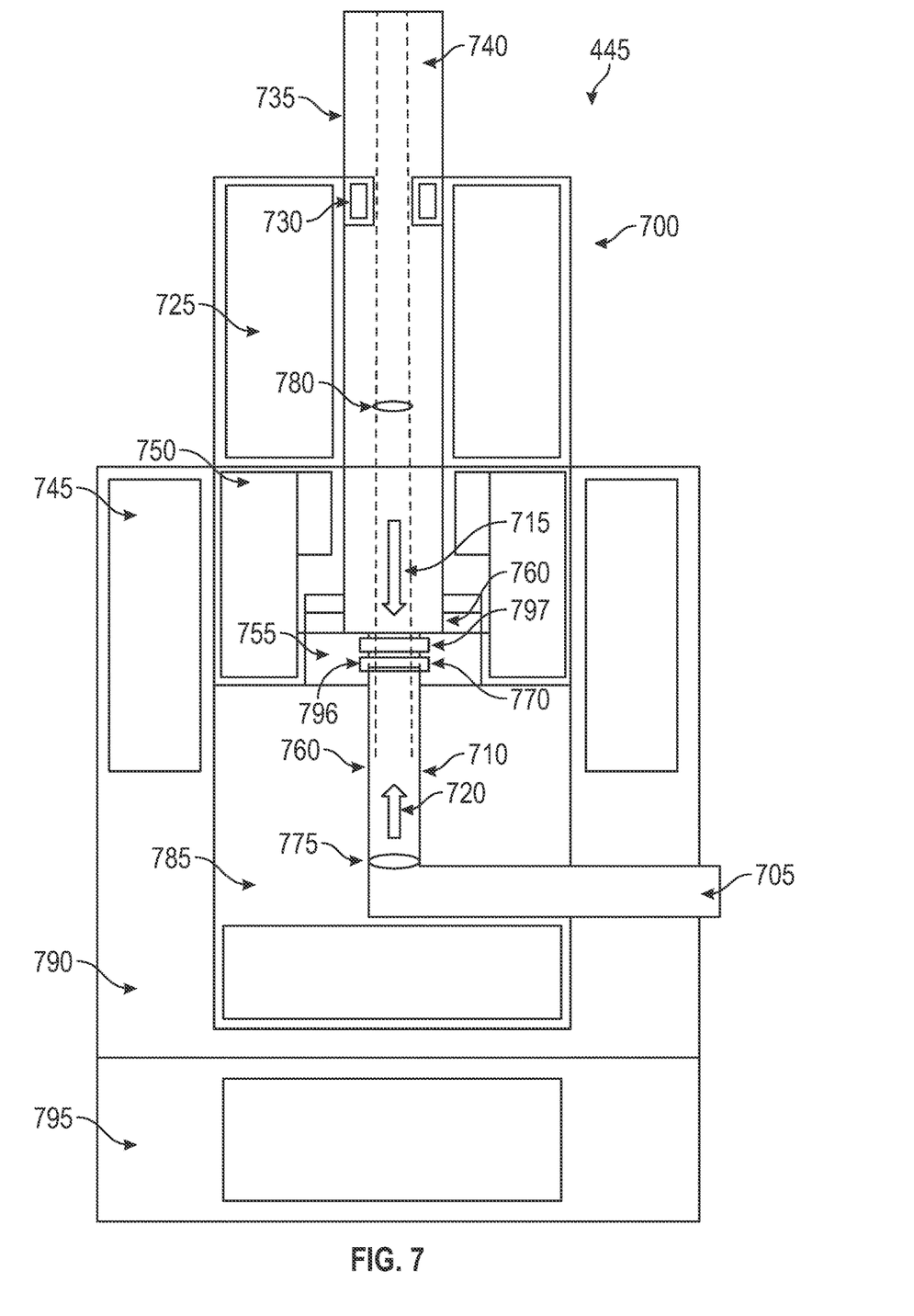
FIG. 7 depicts an elevation view of a treatment distribution assembly, in accordance with the disclosed embodiments.

As such, the permeate 440 from the contaminant filter 430 can be provided to a treatment distribution assembly 445. The treatment distribution assembly includes a number of specially designed components configured to allow the permeate stream 440 to be further exposed to a particle beam 450, most commonly embodied as an electron beam, generated by the accelerator assembly 455. The accelerator assembly 455 can be configured to expose the permeate stream 440 to a specific dose of ionizing radiation, necessary to kill any biological material or other such biohazard in the permeate stream, that might be dangerous to a human. In certain embodiments, this dose can correlate to the regulations set by a regulating agency. The permeate stream 440 (i.e., the water to be treated) flows past flow meter 470 through conduit 705. Once the permeate stream 440 reaches the treatment portion of the conduit 710, the conduit is designed to make the flow laminar. The beam 450 cross section is matched to the conduit 710 diameter. Once the interaction between the beam 450 and permeate stream 440 is complete, the treated water passes through a seepage drain which controls the flow of treated water that can be collected as potable water.

Control of the accelerator assembly can be provided by a control system 465, which can further comprise a computer system, mobile device, or other such device. The control system 465 can include a monitoring module 475 to monitor the flow rate of the water, and a beam control module 480 to adjust the beam power from the accelerator to ensure the water is being sufficiently treated. The control system can include an interface that allows a user to input a desired dose, or can be set automatically to a dose greater than or equal to, the dose required by the Food and Drug Administration.

A series of one or more flow switches 485 can be provided as a fail-safe. The flow switches enable automatic control of the Bios of the system. In the event of a machine failure the flow switches can detect the failure and turn the pumps off so that source water is not pumped through the system without treatment and mistaken for potable water.

The control system can include a wired or wireless connection to the accelerator assembly 455, the pump 415 and/or other pumps connected to the system 400, and/or to a flow meter 470 configured to measure the flow rate of the water. In certain embodiments, the control system 455 can receive input from the pumps 415 and/or flow meter 470 and provide the current flow rate on a display. In certain embodiments, the control system 455 can further include user controls 490, that allow the user to set the dose level, adjust the flow rate, and/or adjust the beam power. Manual control of flow and rates is optional.

As the flow rate is adjusted, the control system 455 can automatically adjust the beam power so that the water exiting the system 400 receives the necessary or desired dosage. Specifically, the power of the electron beam will define the penetration depth of the beam in the water. If the flow rate of the water is low, the penetration depth of the electron beam can also be relatively low because the flowing water will be exposed to the beam for a longer period of time. However, as the flow rate of the water increases the exposure time for the water decreases. As such the beam power must be increased to ensure the water receives the required dose over the shorter exposure time. This relationship is illustrated by equation (1):

$$\text{Beam Power [kW]/Dosage [kGy]} = \text{Throughput kg/sec} \quad (1)$$

The treatment distribution assembly 445 delivers the potable permeate stream to a spigot 460 where the now potable water is distributed.

In certain cases, the system 400 can be used to produce up to 50 gallons per minute of potable water using a 0-40 kW beam power. The dosage applied will vary according to the regulating agency requirement or limit, the power of the particle accelerator, and the efficiency of the beam delivery system. In certain embodiments, dose range can be from 1 Gy to 3000 kGy. The size of the system 400 makes it portable, meaning it can be delivered to an area affected by a natural disaster quickly and at relatively low cost. Once in place, the system 400 can provide potable water more quickly and less expensively than other known methods (such as vehicle delivery of bottled water).

One key aspect of the water treatment system is the accelerator assembly. U.S. Pat. No. 10,070,509, titled "COMPACT SRF BASED ACCELERATOR," issued on Sep. 4, 2018, describes a particle accelerator comprising an accelerator cavity, an electron gun, and a cavity cooler configured to at least partially encircle the accelerator cavity. The cooling connector and an intermediate conduction layer are formed between the cavity cooler and the accelerator cavity to facilitate thermal conductivity between the cavity cooler and the accelerator cavity. The embodiments disclosed therein teach a viable, compact, robust, high-power, high-energy electron-beam, or x-ray source. The disclosed advances are integrated into a single design, that enables compact, mobile, high-power electron accelerators. U.S. Pat. No. 10,070,509 is herein incorporated by reference in its entirety. It should be appreciated that other accelerator assemblies can be used in other embodiments without departing from the scope of the present disclosure.

Figure 5:
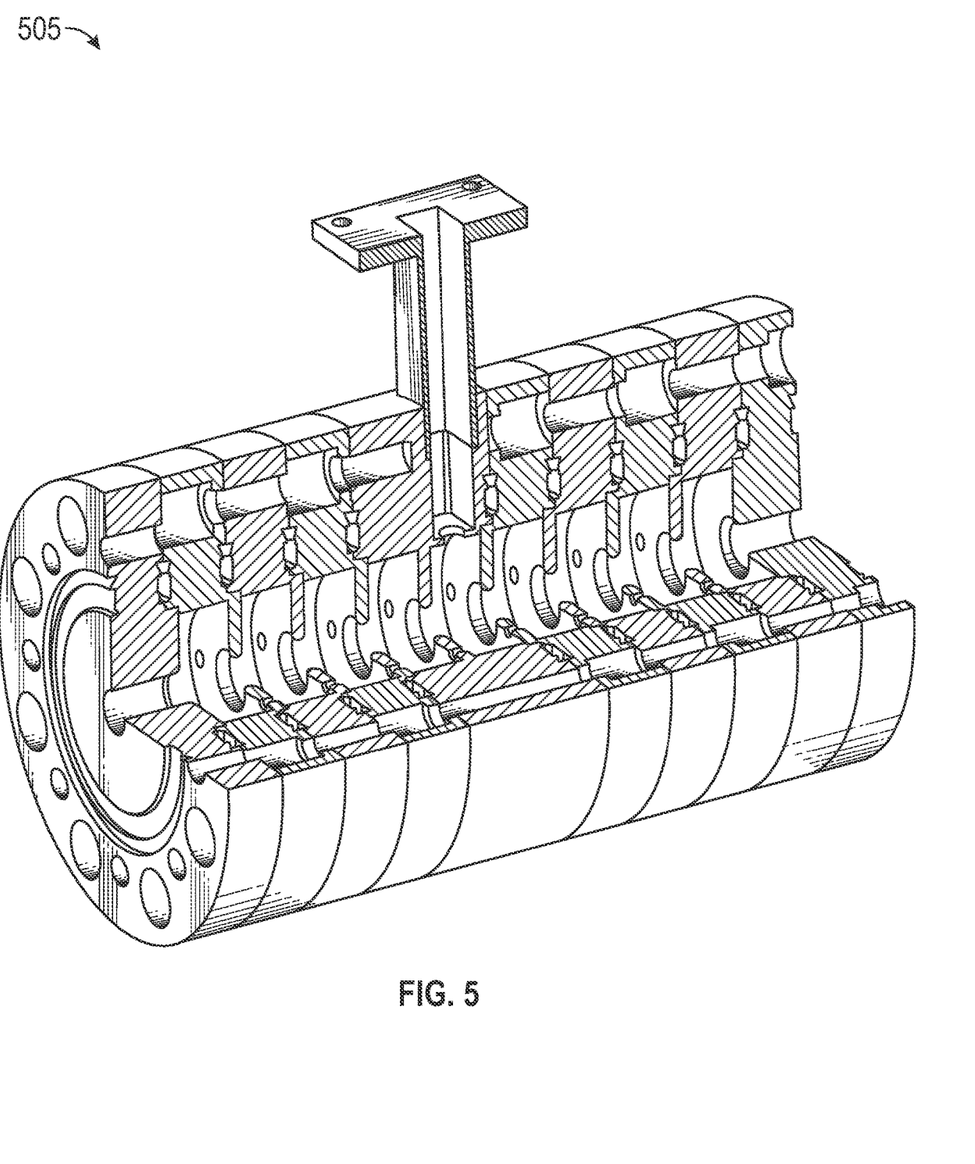
FIG. 5 depicts a perspective cut-away view of RF structures that can form elements of an electron accelerator that can be adapted for use in accordance with a preferred embodiment.

FIG. 5 illustrates a perspective cut-away view of an RF structure 505 that can form elements of an electron accelerator that can be adapted for use in accordance with embodiments disclosed herein. Note that RF accelerator and electron gun structures can be employed to produce electron beams of the required energy for implementation of the disclosed embodiments. An electron accelerator, for example, that employs the RF structure 450 can accelerate electrons generated from an electron gun with RF electric fields in resonant cavities sequenced such that the electrons are accelerated due to an electric field present in each cavity as the electron traverses the cavity to reach a beam extraction device. The accelerator can thus be an SRF electron beam accelerator.

Figure 6:
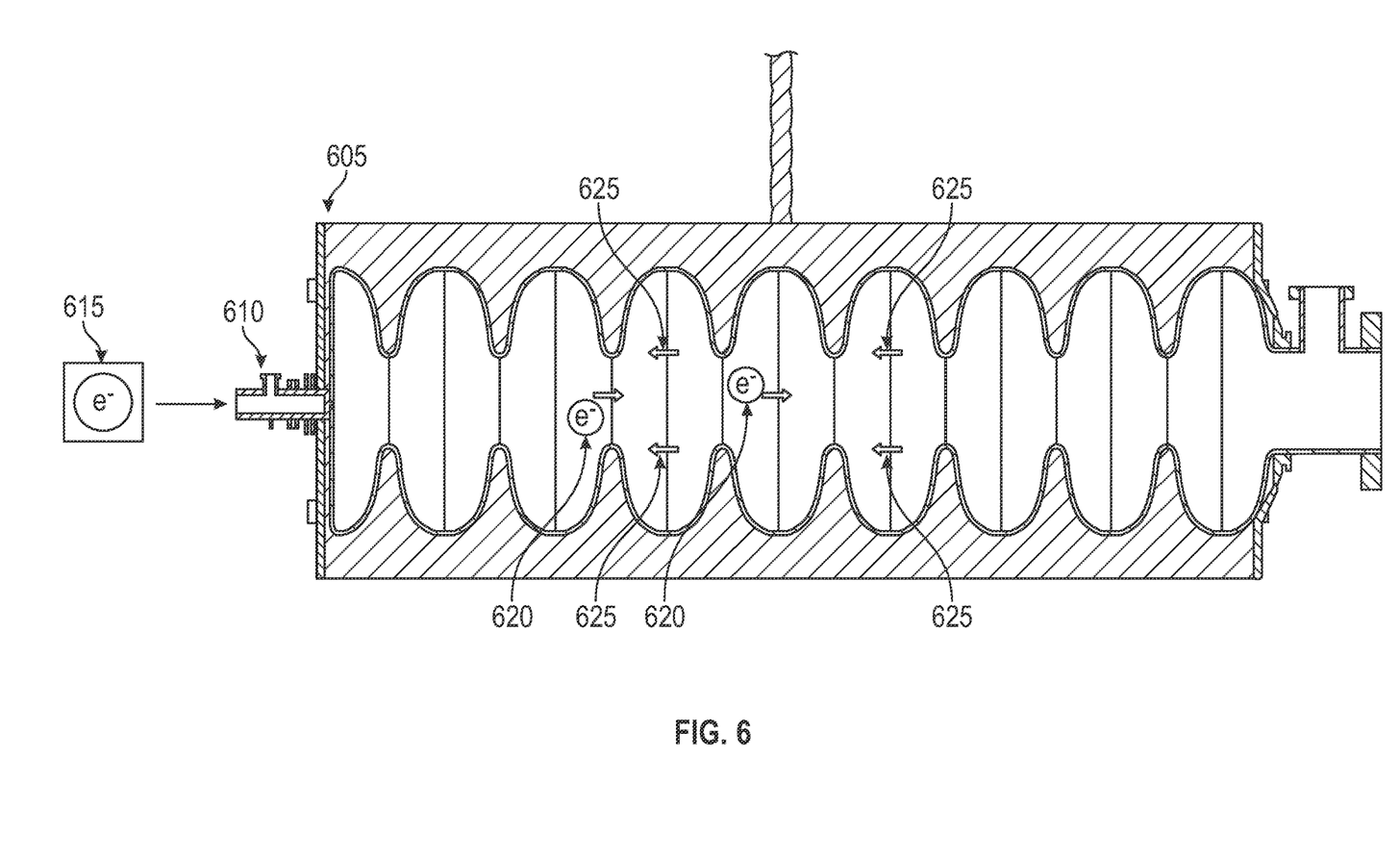
FIG. 6 depicts a perspective cut-away view of a superconducting RF structure that can also form elements of an electron accelerator adapted for use in accordance with an embodiment. The figure indicates the operating principles of such an elliptical RF cavity.

FIG. 6 illustrates a perspective cut-away view of a four cell elliptical superconducting RF structure 605 that can also form elements of an electron accelerator adapted for use in accordance with an embodiment. Note that varying embodiments can employ alternative cavity geometries and/or cell numbers. FIG. 6 generally indicates the operating principles of an elliptical RF cavity. Advancements in SRF technology can enable even more compact and efficient accelerators for this application.

The RF structure 605 of FIG. 6 demonstrates the principle of operation in which alternating RF electric fields can be arranged to accelerate groups of electrons timed to arrive in each cavity when the electric field in that cavity causes the electrons to gain additional energy. In the particular embodiment shown in FIG. 6, a voltage generator 610 can induce an electric field within the RF cavity. Its voltage can oscillate, for example, with a radio frequency of 1.3 Gigahertz or 1.3 billion times per second. An electron source 615 can inject particles into the cavity in phase with the variable voltage provided by the voltage generator 610 of the RF structure 605. Arrow(s) 620 shown in FIG. 6 indicate that the electron injection and cavity RF phase is adjusted such that electrons experience or "feel" an average force that accelerates them in the forward direction, while arrow(s) 625 indicate that electrons are not present in a cavity cell when the force is in the backwards direction.

It can be appreciated that the example RF structures 505 and 605, respectively shown in FIGS. 5-6, represent examples only and that electron accelerators of other types and configurations/structures/frequencies may be implemented in accordance with alternative embodiments. That is, the disclosed embodiments are not limited structurally to the example electron accelerator structures 505, or 605, respectively shown in FIGS. 5-6, but represent merely one possible type of structure that may be employed with particular embodiments. Alternative embodiments may vary in structure, arrangement, frequency, and type of utilized accelerators, RF structures, and so forth. The accelerators disclosed herein can provide up to 9 MeV far outpacing other current mobile accelerator technologies.

FIG. 7 provides a detailed elevation view of the treatment distribution assembly 455. The electron beam generated by the accelerator can be deleterious to the components of the system 400 along with other associated equipment. Therefore, the treatment distribution assembly 455 can be designed to safely contain the electron beam and effectively ensure the electron beam treats the incoming permeate.

The treatment distribution assembly 445 includes a conduit 705 through which the permeate enters the treatment distribution assembly 445, the conduit 705 can be shaped in various ways but the treatment portion of the conduit 710 is configured such that the angle of incidence between the electron beam is either 0 degrees (i.e. the beam path is in line or substantially in line to the direction of flow) or 180 degrees (i.e. the beam path is head-on or substantially head-on to the direction of flow). In FIG. 7 the beam path, shown by arrow 715, has a 180 degree angle of incidence to that of the fluid flow shown by arrow 720, such that the electron beam is head-on to the flow path of the fluid (e.g., permeate) flowing through the treatment portion of the conduit 710.

In certain embodiments, the length of the treatment portion of the conduit 710 can be at least a factor of 2 or greater than the diameter 775 of the conduit, to create laminar flow, and provide adequate exposure time to ensure the water is safe to drink. It should be appreciated that, as illustrated in FIG. 7, the treatment portion of the conduit 710 is oriented vertically with the flow direction being vertically upward as shown by arrow 720. This is advantageous because the upward flow of the water is countered by the force of gravity ensuring a laminar or near laminar flow in the treatment portion of the conduit 710.

The treatment distribution assembly 455 includes a shielding assembly 700 configured around the conduit 705. The shielding assembly 700 includes an arrangement of shielding blocks and structures. Each of the shielding blocks can comprise an exterior stainless steel layer surrounding a lead core. The lead core serves as radiation shielding.

As shown in FIG. 7 the shielding blocks include upper shielding block 725, with rim shielding block 730 affixed thereto. The upper shielding block 725 and rim shielding block 730 encircle the vacuum beam extraction port 735, through which the particle beam 740 propagates from the accelerator assembly. Lower shielding block 745 is connected to an inner shielding block 750 that surrounds an intermediate barrier 755. The intermediate barrier 755 interfaces with the vacuum window 760 of the vacuum beam extraction port 735, and serves as the interface through which the electron beam 740 exits the vacuum beam extraction port 735 and meets with the fluid flow shown by arrow 720. Below the fluid surface 770 a protective barrier 796 can be formed, that isolates the vacuum window 760 from exposure to water. The protective barrier 796 is located to ensure a medium separates the exiting treated water and the vacuum window 760. The water then flows through a seepage drain 797 that allows the treated water to follow exiting conduit to spigot 460.

As shown in FIG. 7, the beam 740 has a penetrating depth 765 beyond the fluid surface 770 of the fluid flow. As described above, the penetrating depth 765 of the beam 740 is related to the energy of the beam 740, and the beam power can be adjusted to ensure the permeate receives the necessary dose of ionizing radiation to make it safe to drink. The diameter 780 of the electron beam 740 can also be adjusted by focusing elements to be substantially equivalent to (or slightly less than) the inner diameter 775 of the conduit 705. The focusing elements can comprise one or more solenoids, and/or quadropole magnets. This diameter is selected so that all the water in the conduit is exposed to the electron beam 740, and to prevent damage to the conduit 705.

The shielding assembly 700 further comprises a support structure that includes a conduit support 785 that surrounds and supports the conduit 705, and can be comprised of stainless steel with a lead plug formed beneath the conduit 705. A lower machine shielding support 790, can surround the conduit support 785 that can also be formed of stainless steel, and a base support 795 that can comprise an exterior stainless steel layer surrounding a lead core.

Figure 8:
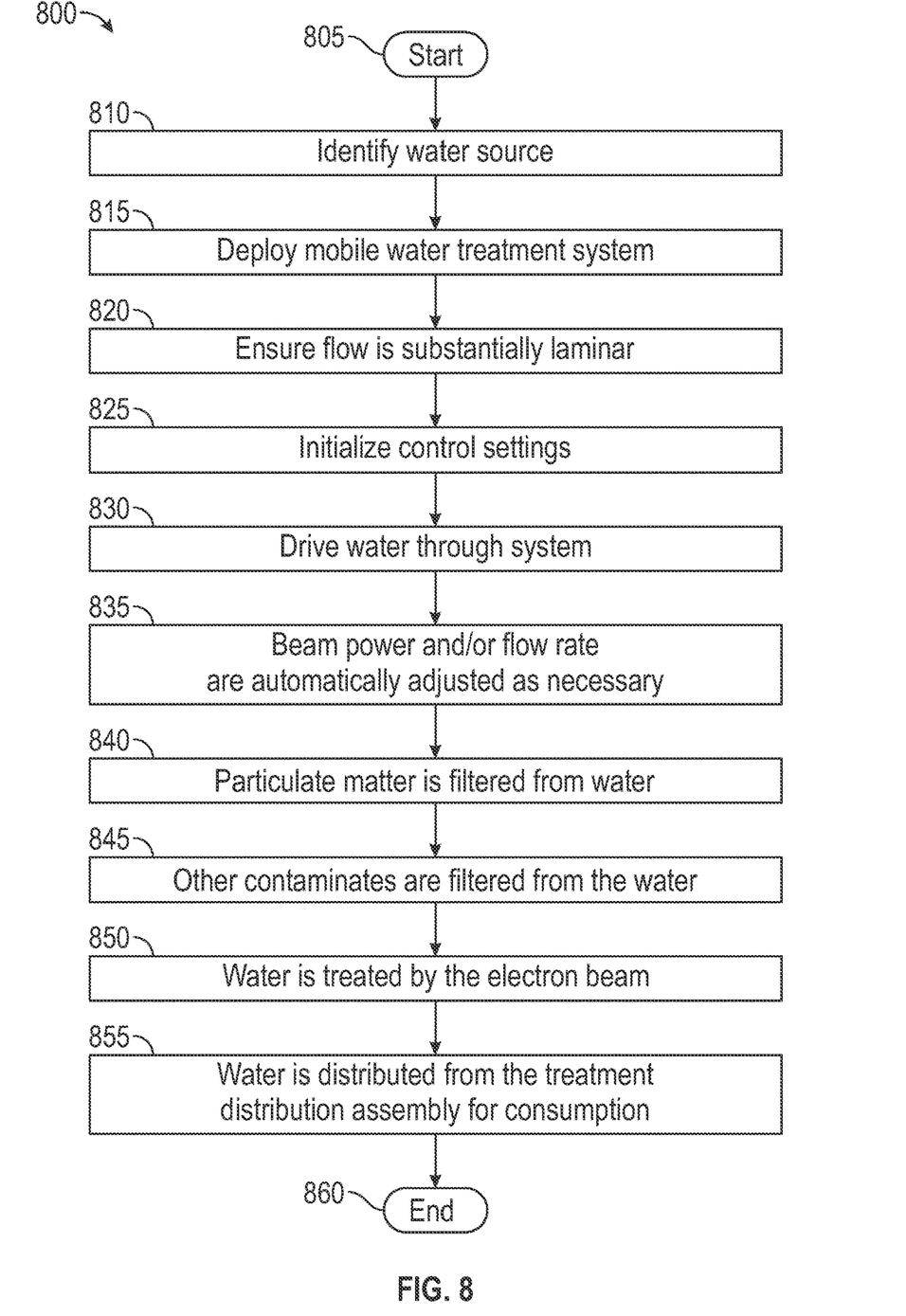
FIG. 8 depicts a method for water treatment in accordance with the disclosed embodiments.

FIG. 8 illustrates steps associated with a method 800 for treating water in accordance with the disclosed embodiments. The method begins at step 805. At step 810 a water source can be identified. This can include identifying contaminated or potentially contaminated water sources. In some cases, this may further include identifying a water source proximate to disaster victims, or other people in need of potable water.

Next at step 815, the mobile water treatment system can be deployed at or near the identified water source. Deployment can also include assembling various components of the water treatment system, including but not limited to, selecting and configuring cartridge filters, selecting and configuring contaminant filters, engaging and priming pumps, initializing the particle accelerator, and other such initialization steps.

The system can be configured with conventional water pipes such as 2 inch water pipes, or other dimensioned pipes, that create fluidic connections between the various filters and stages of the mobile water treatment system. The system can be modular such that all the various steps or components can be interchanged in various embodiments. Depending on the source water and the dedicated use of the embodiment, the application of treatment could be utilized on the concentrate stream or the original source stream. It should be noted that the cartridge filtering stage and/or the contaminant filtering stage are not required and can be excluded from the system in certain embodiments. However, the cartridge filtering stage and contaminant filtering stage are useful in making the water more palatable.

The system can be configured so that the angel of incidence between the water flow and the electron beam is either at or near 0 degrees (i.e. the water is flowing in the same direction as the beam is propagating) or at or near 180 degrees (i.e. the water is flowing head on into the direction the beam is propagating). The orientation of the beam and water flow is selected to maximize their interactive cross section.

It should be appreciated that in certain embodiments, this can be achieved by orienting the flow of the water vertically upward, and orienting the beam propagation directly downward into the water. This is advantageous because the upward flow of the water is countered by the force of gravity ensuring a laminar, or near laminar flow. In certain embodiments, the vertical section can be at least eight times the diameter of the pipe. A laminar flow is desirable because disturbances in the flow may result in wasted beam energy and/or volumes of water that do not receive a sufficiently ionizing dose. Thus, in embodiments, where the orientation of the flow is not vertically upward, measures can be taken to ensure the flow remains laminar or substantially laminar as shown at step 820.

Next, the control settings for the system can be initialized as shown at step 825. According to present standards set by the FDA, greater than 10 kGy are required to make water safe for human consumption. The electrons emanating from the accelerator will have a penetrating depth into the flowing water that is dependent on the power of the electron beam. The throughput of the mobile water treatment system can thus be set by the flow rate of the water in combination with the power of the electron beam.

For example, if the beam power is high the amount of exposure time required to receive an adequate dose of electrons will be relatively short. As such, the flow rate of the water can be increased. By contrast, if high throughput is not required, the power of the electron beam can be reduced, in concert with a reduced flow rate, because the beam will treat each discrete volume of fluid longer (because it is moving slower). In certain embodiments, the length of conduit where beam interaction with the water therein takes place can be at least a factor of 8 greater than the diameter of the conduit, to provide adequate exposure time to ensure the water is safe to drink.

With the control system initialized, water can be driven through the mobile water treatment system as shown at step 830. In certain embodiments, this can be accomplished using a pump. However, in other embodiments, if the water source is at a higher elevation than the mobile water treatment system, the force of gravity can be used to drive water through the system. This has the advantage that no power is required to pump the water, increasing efficiency to the system.

The control system can be used to control the flow rate of water through the system. For example, if high throughput is required, the control system can provide a control that allows a user to increase the flow rate. The control system can provide a signal to the pump indicating higher throughput is required. The control system can also adjust the beam power automatically, according to the selected flow rate, to ensure the water is receiving an adequate dose of electrons as shown at step 835. In certain embodiments, the control system can allow a user to select a desired minimum dose. The system can further be configured to require the minimum dose to exceed the standards set by the regulating agency.

As water flows past the cartridge filter, particulate matter can be filtered from the water as illustrated at step 840. At step 845, the contaminant filter further removes other contaminants and minerals. Both steps 840 and 845 are optional. At this point, the permeate from the contaminant filter enters the treatment distribution assembly. Conduit in the treatment distribution assembly is configured at angel of incidence between the water flow and the electron beam that maximizes their interactive cross section. The electron beam treats the water, making it potable, as illustrated at step 850.

At step 855, the treated water can then flow out of a spigot associated with the treatment distribution assembly and can be distributed to storage containers or the like so that it can be provided as potable drinking water. The method ends at 860.

Based on the foregoing, it can be appreciated that a number of embodiments, preferred and alternative, are disclosed herein. It should be appreciated that variations of the above-disclosed and other features and functions, or alternatives thereof, may be desirably combined into many other different systems or applications. In an embodiment, a purification system comprises a particle accelerator configured to generate a particle beam and a conduit configured to be substantially in line with the particle beam wherein the electron beam is incident on a fluid flowing through the conduit. In an embodiment the particle beam accelerator comprises an SRF electron beam accelerator.

In an embodiment, the system further comprises a cartridge filtering system. In an embodiment, the cartridge filtering system further comprises at least two filters organized in parallel. In an embodiment, the system further comprises at least one of a reverse osmosis filtering system, a granular activated carbon filtering system, and a deionized filtering system.

In an embodiment, the system further comprises a shielding assembly configured around the conduit.

In an embodiment, the diameter of the particle beam is substantially equivalent to an inner diameter of the conduit. In an embodiment, the particle beam is oriented to be substantially head on to a direction of flow of the fluid in the conduit.

In an embodiment, the system further comprises a control system configured to adjust a power of the particle beam according to a flow rate of the fluid flowing in the conduit. In an embodiment, the system further comprises a pump configured to pump the fluid through the conduit and a flow meter configured to measure the flow rate of the fluid flowing in the conduit.

In another embodiment, a purification system comprises a particle accelerator configured to generate an electron beam, a conduit for transporting water from a water source, and a treatment distribution assembly, the treatment distribution assembly further comprising a treatment portion of the conduit configured to be substantially in line with the electron beam. In an embodiment the particle beam accelerator comprises an SRF electron beam accelerator.

In an embodiment, the system further comprises a cartridge filtering system. In an embodiment the system further comprises a second contaminant filter.

In an embodiment, the treatment distribution assembly further comprises a shielding assembly configured around the conduit. In an embodiment, the treatment portion of the conduit is configured to be substantially vertically oriented.

In yet another embodiment, a purification method comprises generating a particle beam with a particle accelerator, creating a fluid flow through a conduit wherein the particle beam is incident on the fluid flowing through the conduit, and controlling a power of the particle beam and a flow rate of the fluid flowing through the conduit with a controller.

In an embodiment, the method further comprises filtering the fluid flow with at least one of a cartridge filtering system and a second contaminant filter.

In an embodiment, the method further comprises adjusting the power of the particle beam according to the flow rate of the fluid flowing through the conduit with the controller.

In another embodiment, the method further comprises adjusting a diameter of the particle beam to be substantially equivalent to an inner diameter of the conduit and orienting the electron beam to be substantially head on to a direction of flow of the fluid in the conduit.

It should be understood that various presently unforeseen or unanticipated alternatives, modifications, variations or improvements therein may be subsequently made by those skilled in the art which are also intended to be encompassed by the following claims.

What is claimed is:

1. A purification system comprising:
   a particle accelerator configured to generate a particle beam;
   a conduit configured to carry a fluid, wherein the particle beam is incident on the fluid flowing through said conduit, wherein the particle beam and conduit are configured to be substantially parallel at a point in the conduit where the particle beam is incident on the fluid;
   a control system configured to accept input from a flow meter, and a beam control module configured to adjust the beam power to both the input from the flow meter according and a desired dosage.

2. The purification system of claim 1 wherein said particle beam accelerator comprises an SRF electron beam accelerator.

3. The purification system of claim 1 further comprising:
   a cartridge filtering system.

4. The purification system of claim 3 wherein said cartridge filtering system further comprises:
at least two filters organized in parallel.

5. The purification system of claim 1 further comprising at least one of:
a reverse osmosis filtering system; and
a granular activated carbon filtering system.

6. The purification system of claim 1 further comprising:
a shielding assembly configured around said conduit.

7. The purification system of claim 1 wherein a diameter of said particle beam is substantially equivalent to an inner diameter of said conduit.

8. The purification system of claim 1 wherein said particle beam is oriented to be either 0 degrees or 180 degrees to a direction of flow of said fluid in said conduit at the point in the conduit where the particle beam is incident on the fluid.

9. The purification system of claim 1 wherein the control system is configured to adjust a power of said particle beam to have an energy between 0 and 40 kW.

10. The purification system of claim 9 further comprising:
a pump configured to pump said fluid through said conduit; and
wherein a beam interaction depth within the fluid can be at least a factor of 8 greater than a diameter of the conduit.

11. A water purification system comprising:
a particle accelerator configured to generate an electron beam;
a conduit for transporting water from a water source; and
a treatment distribution assembly, said treatment distribution assembly further comprising a treatment portion of said conduit configured to be substantially parallel at a point in the conduit where the electron beam is incident on the water in the conduit; and
a control system configured to adjust electron beam power according to both the flow rate of the water and a desired dosage.

12. The purification system of claim 11 wherein said particle beam accelerator comprises an SRF electron beam accelerator.

13. The purification system of claim 11 further comprising:
a cartridge filtering system.

14. The purification system of claim 11 further comprising:
a second contaminant filter.

15. The purification system of claim 11 wherein the treatment distribution assembly further comprises:
a shielding assembly configured around said conduit.

16. The purification system of claim 11 wherein the treatment portion of said conduit is configured to be substantially vertically oriented, and the electron beam is configured to be substantially vertically oriented.

* * * * *